United States Patent [19]

Vicenzi

[11] Patent Number: 4,794,943

[45] Date of Patent: Jan. 3, 1989

[54] FLUID CONTROL VALVE ASSEMBLY

[75] Inventor: Reno L. Vicenzi, Moreno Valley, Calif.

[73] Assignee: Figgie International Inc., Richmond, Va.

[21] Appl. No.: 199,807

[22] Filed: May 27, 1988

[51] Int. Cl.⁴ .................... F16K 11/02; F16K 31/165

[52] U.S. Cl. .......................... 137/625.44; 137/627.5; 137/862; 137/885; 137/903; 251/61; 251/901

[58] Field of Search ................ 137/625.44, 627.5, 861, 137/862, 875, 883, 885, 903; 251/61, 901

[56] References Cited

U.S. PATENT DOCUMENTS

| | | | |
|---|---|---|---|
| 2,860,631 | 11/1958 | Sajeck | 138/204.26 X |
| 2,908,508 | 10/1959 | Bronsdon et al. | 137/627.5 X |
| 2,950,738 | 8/1960 | Broadwell | 137/627.5 |
| 2,989,076 | 6/1961 | Rohmann | 251/901 X |
| 2,993,706 | 7/1961 | Kilgore | 137/627.5 X |
| 3,263,693 | 8/1966 | Ages | 137/625.28 X |
| 3,425,447 | 2/1969 | McCullough | 137/625.28 X |
| 3,595,226 | 7/1971 | Newcombe | 128/204.26 |
| 3,692,057 | 9/1972 | Barnd | 137/625.44 |
| 3,719,097 | 3/1973 | Wilkes | 251/901 X |
| 3,767,160 | 10/1973 | McCollum | 251/61 |
| 3,800,828 | 4/1974 | Nelson | 137/627.5 X |
| 4,029,295 | 6/1977 | Wassmer | 251/901 |
| 4,106,524 | 8/1978 | Wunsch | 251/901 X |
| 4,147,176 | 4/1979 | Christianson | 137/102 |
| 4,334,532 | 6/1982 | Jackson | 128/204.26 |
| 4,378,011 | 3/1983 | Warncke et al. | 128/204.26 |
| 4,510,972 | 4/1985 | Creedon | 251/901 X |
| 4,667,670 | 5/1987 | Feathers | 137/908 X |
| 4,693,242 | 9/1987 | Biard | 137/908 X |

FOREIGN PATENT DOCUMENTS

| | | | |
|---|---|---|---|
| 2201560 | 7/1973 | Fed. Rep. of Germany | 251/901 |

*Primary Examiner*—John Rivell
*Attorney, Agent, or Firm*—Christel, Bean & Linihan

[57] ABSTRACT

A valve assembly (10) for controlling high pressure gas with low controlling gas pressures. The assembly includes a valve housing (12) having a cavity (22), an inlet port (26) and two outlet ports (28, 30). Mounted within the housing in communication with each outlet port are tubular members (38), each having a closed end (38.3) and an aperture (42) in a smooth cylindrical sidewall (38.2). A wobble bar (50) within the cavity is associated with a rubber-like sheet of material (54), which sheet has two sealing portions (56.2, 56.4) draped over the apertures. A very soft sponge-like resilient block (56) normally holds the sealing portions against the apertures to cause the apertures to be sealed. Actuating structure causes the wobble bar to be moved from a normal position to an operative position, an end of the wobble bar bearing down upon another portion of the rubber-like sheet of material to cause an adjacent sealing portion to peel away from the aperture to permit flow through the aperture. The actuating structure includes a rotatable shaft (48) on which the wobble bar is securely mounted, an actuator housing (14) having a sensing chamber (66) connected to the controlling low pressure, and a slidable shaft (72) connected to a diaphragm (68) along one side of the sensing chamber, the other end of the slidable shaft being connected with the rotary shaft in such a manner that linear motion of the slidable shaft will cause correlated rotary motion of the rotary shaft.

16 Claims, 2 Drawing Sheets

FLUID CONTROL VALVE ASSEMBLY

FIELD OF THE INVENTION

The present invention relates generally to a fluid control valve assembly, and more particularly to such an assembly for stopping and starting a high pressure gas flow with very low positive and negative gas pressures.

BACKGROUND OF THE INVENTION

Some pneumatic devices, such as air logic system components, require only low flows for their operation but need pressures above 35 psi to operate reliably. In some instances where it is desirable to use these devices in conjunction with very low pressure systems, there is a need for a low pressure system to effect control of the high pressure system. For example, this would be true in a ventilator/resuscitator such as the type shown in U.S. Pat. No. 4,651,731, the subject matter of which is incorporated herein by reference thereto. Thus, in a ventilator/resuscitator the system may normally be cycled by high pressure air (for example 50 psi) under primary control. However, it may be desirable to provide patient override control means having input pressures plus 10 to 70 or minus 1 to 3 cm. of water. In order to provide satisfactory operation of such air logic control valves it is therefore necessary to have a relatively high work ratio where a pressure of one unit pressure could control, for example, a pressure approximately 1500 times greater.

While prior art devices for this purpose are known in the art, (such devices customarily being designated as "demand valves"), they are generally large, expensive, and can be easily damaged. In addition, they customarily operate in only one mode, such as only under the influence of negative pressure. Typical demand valves are shown in U.S. Pat. Nos. 2,860,631, 3,595,226, 4,416,176, 4,334,532 and 4,378,011.

OBJECTS AND SUMMARY OF THE INVENTION

It is an object of the present invention to provide a fluid control valve assembly capable of stopping and starting a high pressure flow in response to very low pressures.

More particularly, it is an object of the present invention to provide a fluid control valve assembly capable of starting and stopping a high pressure flow with very low positive and negative pressures such as exist in a person's breathing effort.

It is a further object of the present invention to provide such a valve assembly which is compact and light weight so that it can be used in portable equipment.

It is a still further object of the present invention to provide such a valve assembly which is inexpensive to manufacture and yet is sturdy and reliable in operation.

Another object of the present invention is to provide such a valve assembly which is so designed that there is minimal friction in its operation.

A still further object of the present invention is to provide such a valve assembly wherein the valve is opened with a minimal cracking force.

In summary, the above is achieved by providing a valve housing having an enclosed cavity therein, which cavity is capable of containing fluid under pressure, the housing in addition being provided with inlet and outlet ports. A tubular member is associated with each outlet port and has a smooth cylindrical portion disposed within the cavity, the smooth cylindrical portion having a closed end and an aperture in a sidewall. A wobble bar is disposed within the cavity and is moveable between a normal position and a first operative position. A rubber-like sheet of material is associated with the wobble bar and has a portion draped over the aperture in the smooth cylindrical portion of the first tubular member. Resilient means in the form of a very soft sponge-like resilient block is disposed within the cavity and bears against that portion of the rubber-like sheet of material which is draped over the aperture. Actuating means is provided which is capable of causing the wobble bar to be moved from its normal position to its first operative position, the wobble bar bearing down upon the rubber-like sheet of material to cause it to peel away from the aperture in the cylindrical portion of the first tubular member to permit flow through the aperture. The actuating means includes a rotatable shaft which extends through the valve housing, the wobble bar being mounted on the shaft for rotation therewith. The actuating means further includes an actuator housing which is mounted on the valve housing, the actuator housing having a cavity therein, and a diaphragm which extends across the cavity of the actuator housing, the diaphragm defining a sensing chamber with the cavity. An inlet tube extends into the sensing chamber, the inlet tube in turn being adapted to be connected to the controlling low pressure. One end of a slidable shaft is connected to the diaphragm and the other end of the slidable shaft is interconnected with the rotary shaft in such a manner that linear motion of the slidable shaft will cause corresponding rotary motion of the rotary shaft.

The above objects and additional objects and advantages of this invention as well as the structure of this invention will become more apparent to those skilled in the art after a consideration of the following detailed description taken in conjunction with the accompanying drawings in which a preferred form of this invention is illustrated.

DETAILED DESCRIPTION OF A PREFERRED EMBODIMENT

The fluid control valve assembly of this invention is indicated generally at 10 and includes, as major components thereof, a valve housing indicated generally at 12 and an actuator housing indicated generally at 14.

Figures 3, 4, 5:
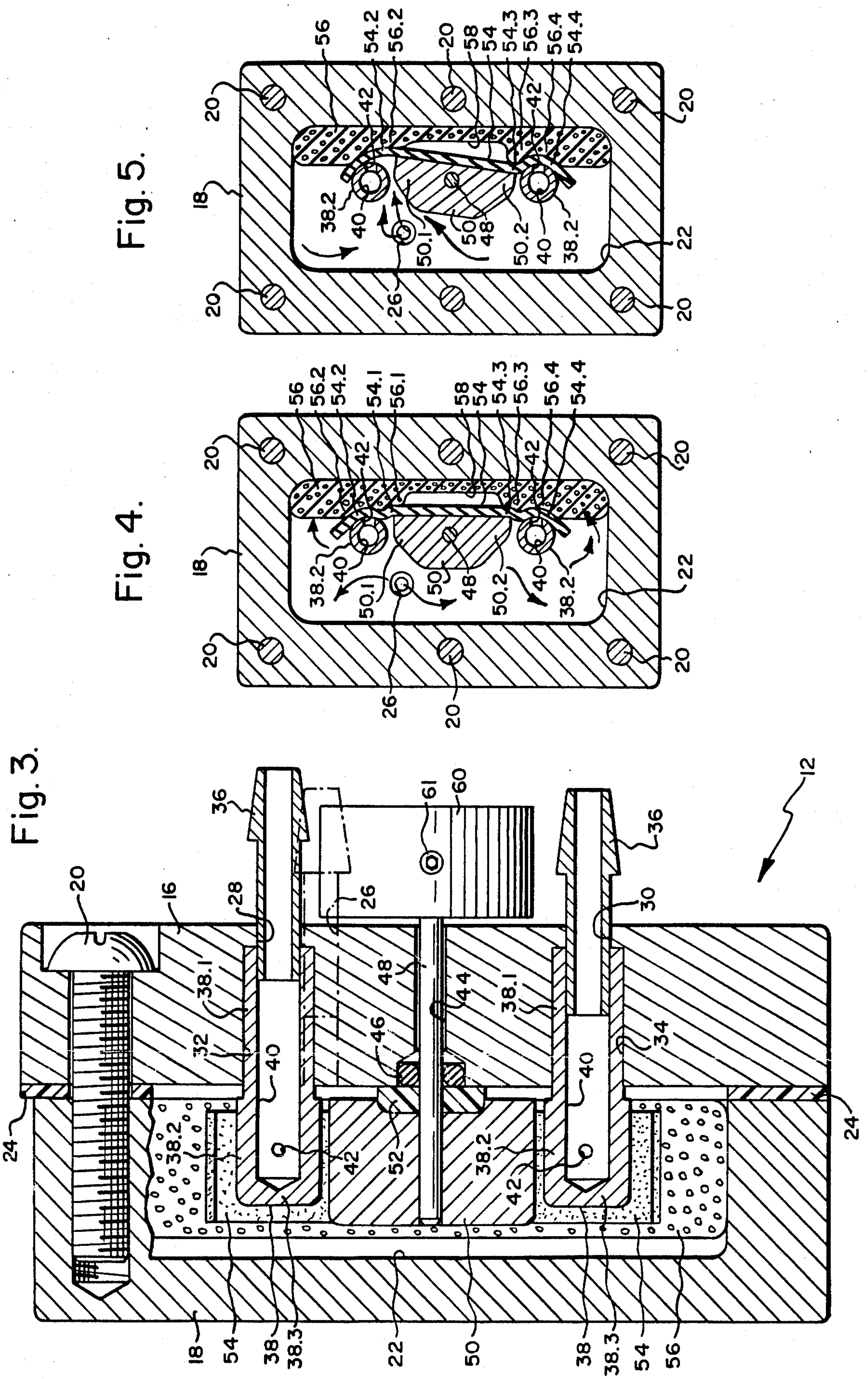
FIG. 3 is a left side sectional view of the valve housing, this view being taken generally along the line 3—3 in FIG. 2.
FIG. 4 is a front sectional view of the valve housing, this view being taken generally along the line 4—4 in FIG. 1 and showing the valve housing when the wobble bar is in its normal position.
FIG. 5 is a view similar to FIG. 4 but showing the wobble bar in its first operative position.

The valve housng 12 is of a clam shell construction and includes front and rear valve housing portions 16, 18, respectively, which portions are secured to each other by fasteners 20. As can best be seen from FIG. 3 the rear valve housing portion 18 is provided with a machined out portion or cavity 22. When the front and rear valve housing portions 16, 18 are in their assembled position shown in FIG. 3 the cavity 22 will be capable of containing fluid under pressure. To insure this, a seal or gasket 24 is disposed between the two housing portions 16, 18.

The front valve housing portion 16 is provided with an inlet port 26 and, in the embodiment illustrated, with two outlet ports 28, 30. Each of the outlet ports 28, 30 is counter-bored as at 32 and 34. Tubular connector members 36 are secured to the inlet and outlet portions, each of the connector members 36 being of identical construction and being provided with a barbed end over which a plastic hose or the like may be telescopically received for transmitting fluid under pressure. It should be noted that the ports 26, 28 and 30 are parallel to each other. Similarly, the counter-bores 32 and 34 are concentric with the ports 28, 30.

In accordance with this invention a first tubular member is associated with one of the outlet ports, and a second tubular member is associated with another outlet port. As each of the tubular members are identical in construction the same reference numerals will be applied to each. Thus, each tubular member 38 is provided with first and second portions, the first portion 38.1 having a cylindrical outer surface of a diameter less than than the cylindrical outer surface of the second portion 38.2. The tubular members are each formed from stainless steel cylindrical rods which are suitably machined to provide the reduced diameter first portion 38.1. In addition, the bars are provided with counter-bores 40 which extend all of the way through the first portion 38.1 and most of the way through the second portion 38.2, there being a closed end portion 38.3 on each tubular member 38. An aperture 42 is formed in each of the tubular members, which aperture extends through the sidewall of the second portion 38.2. After the surface of the cylindrical outer surface of the second portion 38.2 has been suitably polished, the first portion 38.1 of the tubular members are force fit into the counter-bores 32 and 34 in such a manner that the apertures 42 are disposed at right angles to the plane defined by the center line of the ports 28, 30. The bores 40 are of the same diameter as the outlet ports 28 and 30 so that the connectors 36 cannot only be inserted into the ports but also part way into the bores 40 as can best be seen from FIG. 3.

The front valve housing 16 is provided with a rotary shaft receiving bore or aperture 44, the center line of the bore 44 being in the same plane as the center line of the ports 28 and 30 and midway between. The inner end of the bore 44 is counter-bored to receive an O-ring 46. A rotary shaft 48 extends through the bore 44, the shaft 48 being part of the actuating means of this invention. A wobble bar 50 is disposed within the cavity and is press fit about the inner end of the shaft 48 so that it may rotate with the shaft. A low friction bearing, such as a teflon washer 52, is disposed between the wobble bar 50 and the inner surface of the front valve housing portion 16 as can be seen from FIG. 3.

A flexible rubber-like strip of sheet-like material 54 is secured between its ends to the wobble bar, the two ends of the rubber-like sheet 54 being draped over the apertures 42 in the second portion of each of the tubular members 38. When the wobble bar 50 is in its normal position, shown in FIG. 4, resilient means in the form of a very soft, open cell, sponge pad 56 will hold a portion of the rubber-like strip over each of the apertures 42 to effectively seal these apertures. The surface of the sponge 56 below the wobble bar 50 is provided with a recessed area 58.

As previously noted the shaft 48 forms part of the actuator means of this invention. The actuuator means further including connecting means which include a cylindrical knob 60 which is secured in any conventional manner, such as by set screw 61, to the outer end of the rotary shaft 48. A pin 62 extends from one side of the knob 60. It should be appreciated that if the pin 62 is moved upwardly or downwardly as viewed in FIG. 2 that the wobble bar will tend to be moved from its normal position to either a first operative position, shown in FIG. 5, or to its opposite second operative position.

The actuator means further includes pressure responsive means for moving the pin 62, the pressure responsive means including the actuator housing indicated generally at 14 and additional components associated with the actuator housing. The housing 14 includes a lower actuator case 64 which is mounted on valve housing 12, the case being provided with a cavity 66. A diaphragm 68 of a free floating design extends across the cavity in such a manner that the cavity becomes a sensing chamber. An inlet tube 70 extends into the sensing chamber, the inlet tube in turn being connected to the controlling low pressure, which may be either negative or positive. The wall of the lower actuator case 64 which is opposite the diaphragm 68 is provided with an aperture which receives a slidable shaft 72 the upper end 72.1 of the sliding shaft 72 being secured to the diaphragm in any conventional manner. Thus, circular plates 74 may be disposed to either side of the diaphragm, each of the circular plates 74 being provided with a centrally located aperture through which the upper end 72.1 of the slidable shaft 72 may pass, the upper end being threaded and being held in its assembled position shown in FIG. 2 by an upper acorn nut 75 and a lower nut 76. The sliding shaft is sealed by a convoluted rubber seal 78, the radially outer portion of which is secured in place by washer 80 and threaded fasteners 82.

Figure 1:
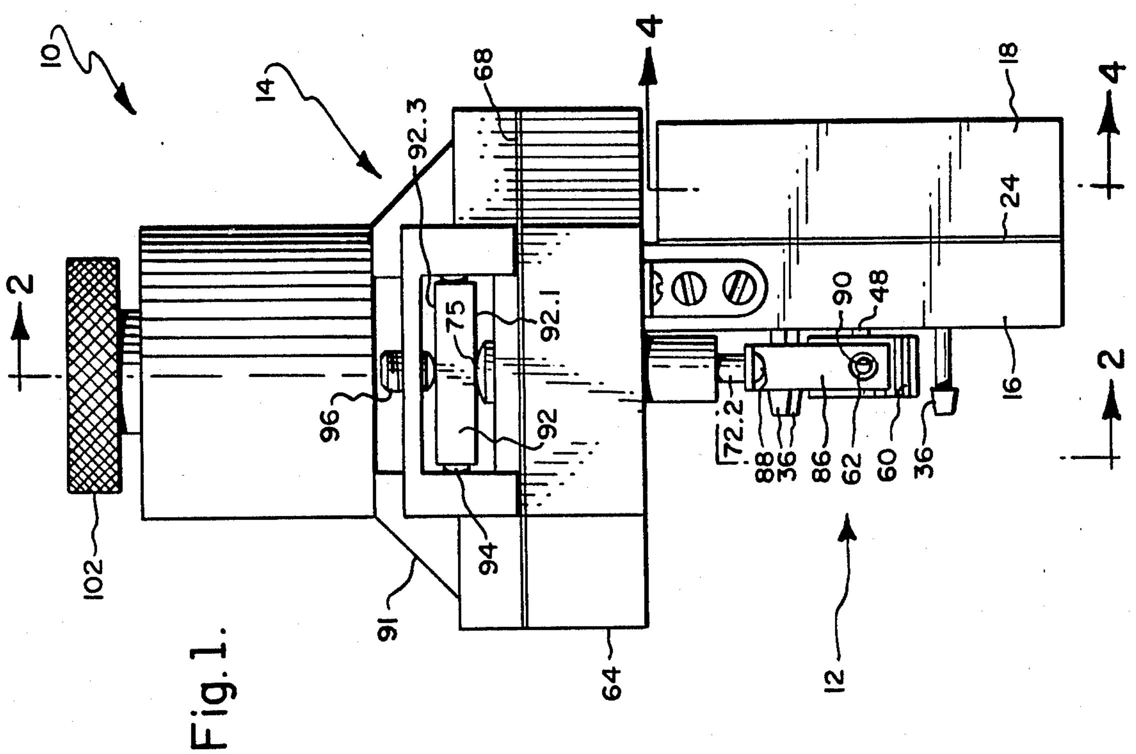
FIG. 1 is a side elevational view of the fluid control valve assembly of this invention.

The lower end 72.2 of the sliding shaft passes through a boss 84 and has secured thereto a clevis 86 by screw 88, the clevis forming part of the connector means which extend between the pressure sure responsive means and the rotary shaft 48. The clevis 86 is provided with an aperture 90 of a diameter in excess of the diameter of the pin 62. As can best be seen from FIGS. 1 and 2 the pin 62 passes through the aperture 90 in clevis 86.

Figure 2:
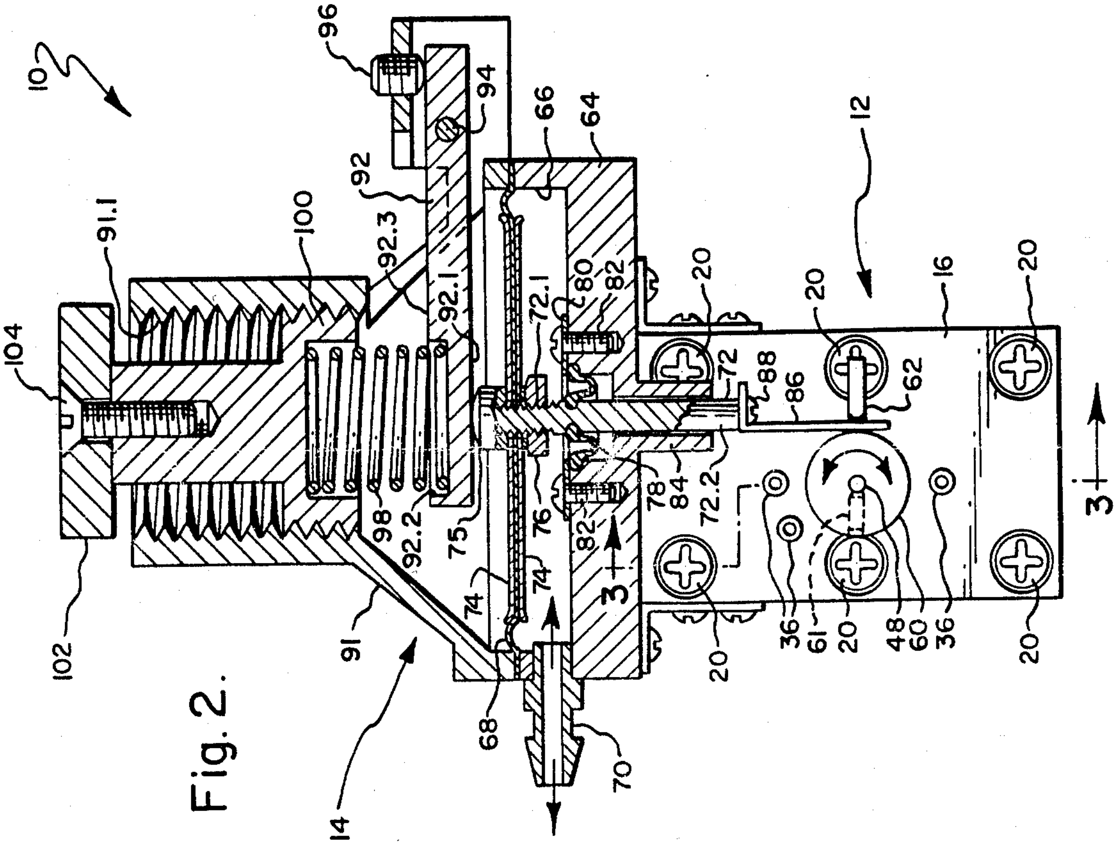
FIG. 2 is a front sectional view taken generally along the line 2—2 in FIG. 1.

In operation it should be apparent that a negative pressure applied to the inlet tube 70 will cause the diaphragm 68 and slidable shaft 72 to move downwardly which will in turn cause the rotary shaft to be rotated in a clockwise direction, as viewed in FIG. 2, due to the interaction of the clevis 86 and pin 62. The rubber seal 78 is convoluted so that it provides very little resistance to the movement of the shaft 72 in either direction. This construction allows actuation of the slidable shaft with a minimum pressure effort such as is required in a breathing ventilator. If operation at a greater negative pressure is required, a spring (not shown) could be added between diaphragm 68 and the upper surface of the cavity 66. If a variable negative pressure actuation is desired, a sealed spring-biased adjustable level (not shown) could be added in a deeper lower case 64.

In order to provide for adjustment for a positive actuating pressure, the upper case 91 of the actuator housing 14 is provided with adjustment means including a lever 92 pivoted about pin 94. The lever is set into its neutral adjustment position by adjusting screw 96 so that its lower surface 92.1 will just rest upon the top of the acorn nut 75 when the wobble bar 50 is in its neutral or normal position. While the diaphragm can move downwardly from this position, movement of the lever 92 is restrained by the adjusting screw 96. However, if a positive pressure is introduced into the cavity 66 the diaphragm 68, acorn nut 75 and lever 92 can be moved upwardly. In order to adjust the force to which this movement is responsive a spring 98 may be provided, the lower end of which spring rests in a recess 92.2 on the upper surface 92.3 of the lever 92. The upper end of the spring 98 is received within an annular cut out in an element 100 having a cylindrical threaded exterior surface, the element 100 in turn being received within a internally threaded cylindrical portion 91.1 of the upper actuator case. A knurled knob 102 is secured to element 100 by screw 104. By adjusting the knob 102 the spring pressure may be varied so that the positive pressure applied through inlet tube 70 must equal the force applied by spring 98 before any upward movement of the diaphragm 68 can occur. When the diaphragm overcomes the bias of spring 98 the diaphragm will move upwardly pulling the slidable shaft 72 up with it and causing the shaft 48 to be rotated.

The high pressure valve housing 12 operates essentially by either causing the sheet of rubber-like material to cover the apertures 42 in the tubular members 38 thereby preventing flow from the inlet port 26 to one of the outlet ports 28, 30. Alternatively, one or the other of the apertures 42 may be uncovered. Thus, if a negative pressure is applied to the inlet tube 70 the rotary shaft 48 will be caused to be rotated in a clockwise direction in the manner described above. Rotation of the shaft 48 in a clockwise direction will cause the wobble bar 50 to be shifted from its normal position shown in FIG. 4 to its first operative position shown in FIG. 5. Thus, as the wobble bar is caused to be rotated in a clockwise direction, its upper or first end 50.1 will bear down on the adjacent first portion 54.1 of the sheet of rubber-like material, causing first and second adjacent portions 56.1 and 56.2 of the sponge to be compressed. As the portion 56.2 of the sponge is compressed, a second portion 54.2 of the sheet of rubber-like material will peel off the cylindrical outer surface of the second portion 38.2 of the tubular member 38 thereby exposing aperture 42 to allow fluid to flow from the inlet port 26 to the outlet port 28. When the wobble bar is in its normal position it should be noted that the pressure in the bore 40 within the tubular member 38 is at atmosphere, or in any event is at a much lower pressure than the source pressure at inlet and within the chamber or cavity 22. Therefore, the portions of the sheet of rubber-like material 54 which overlies the apertures 42 is subject to a sealing force of the source pressure times the area of the aperture 42 to ensure a positive seal. This is achieved in part by utilizing an open cell foam material. However, the peeling action of the sheet 54 from aperture 42 minimizes the force required to start the valve opening. Therefore, once the aperture 42 is cracked open, the force differential between the sides of the valve diminishes rapidly and very little effort is required to achieve full flow.

When the negative pressure at inlet 70 is relieved, that is to say when it is permitted to go above atmospheric the diaphragm 68 will move back against lever 92 and the wobble bar 50 will return to its neutral position closing the aperture 42 and preventing further flow to the outlet port.

In a system where there is no positive pressure after loss of negative pressure it may be necessary to add a light spring between the diaphragm 68 and the lower case in order to ensure that the wobble bar is returned to its neutral position.

While operation of this device has only been described above in connection with negative pressure, it should be appreciated that the device will operate essentially in the same manner when a positive pressure is applied to inlet tube 70, which pressure is sufficient to move the diaphragm 68 upwardly causing corresponding movement of the slidable shaft 72. Thus, if the shaft 72 were to be moved upwardly the wobble bar 50 would be moved in its opposite direction causing its other end 50.2 to bear down upon a third portion 54.3 of the sheet of rubber-like material thereby causing third and fourth portions 56.3 and 56.4 of the sponge 56 to be compressed permitting a fourth portion 54.4 of the sheet of rubber-like material to peel away from the corresponding aperture 42 in the second tubular member 38.

The construction described above combines control of the high pressure with both positive and negative low pressure. Thus, when positive pressure is applied inlet port 26 is fluidically connected to outlet port 30 whereas when negative pressure is applied the connection is from inlet port 26 to outlet port 28. Obviously, by elimination of the appropriate tubular member 38 the present invention can be used as a single pressure control device.

While the normal art of valves for control of gases requires very precise machining, sharp seats, lapped valves, etc., the construction utilized here provides a simple, economical, precision manufacture of valves by center-less grinding and polishing of round stainless steel bars. This provides a quality valve seat that is not easily damaged and can be inexpensively produced. In addition, the sheet of rubber-like material 54 is also easy to mold uniformly and with an excellent finish. In combination, this assembly makes a precision, dependable, and easily manufactured unit.

While a preferred structure in which the principles of the present invention have been incorporated is shown and described above, it is to be understood that this invention is not to be limited to the particular details shown and described above, but that, in fact, widely differing means may be employed in the broader aspects of this invention.

What is claimed is:

1. A fluid control valve assembly operable in response to very small changes in pressure, said valve assembly comprising:

a valve housing having an enclosed cavity therein capable of containing fluid under pressure;

inlet and outlet ports, each extending through a sidewall of the valve housing between an exterior surface of the valve housing and the cavity;

a first tubular member having first and second portions, the first portion being connected to the outlet port and the second portion being disposed within the cavity, said second portion having a closed end and an aperture in a sidewall;

a wobble bar disposed within the cavity and movable between a normal position and a first operative position, the wobble bar having a first end disposed adjacent the second portion of the first tubular member;

a rubber-like sheet of material disposed within the cavity, a first portion of the sheet being disposed adjacent the first end of the wobble bar, and a second portion of the sheet being adapted to overlie the aperture within the second portion of the first tubular member;

resilient means disposed within the cavity, a first portion of the resilient means being disposed adjacent the first portion of the rubber-like sheet and a second portion of the resilient means being disposed adjacent the second portion of the rubber-like sheet, the resilient means bearing against the rubber-like sheet when the wobble bar is in its normal position to force the first and second portions of the sheet of rubber-like material into respective contact with the first end of the wobble bar and the second portion of the first tubular member about the aperture to cause the aperture to be closed; and actuating means capable of causing the wobble bar to be moved from its normal position to its first operative position, the wobble bar bearing down upon the rubber-like sheet of material when in its first operative position to cause the second portion of the resilient means to be compressed and to shift the second portion of the sheet of rubber-like material away from the aperture in the tubular member to cause the aperture to be uncovered whereby fluid can flow from the inlet port to the outlet port.

2. The control valve assembly as set forth in claim 1 wherein the resilient means is a very soft, open cell resilient sponge pad.

3. The fluid control valve assembly as set forth in claim 1 wherein the actuating means includes a rotary shaft journaled within a sidewall of the housing, the rotary shaft having an inner end disposed within the cavity and an outer end disposed outside of the housing.

4. The fluid control valve assembly as set forth in claim 3 wherein the rotary shaft is parallel to the second portion of the first tubular member.

5. The fluid control valve assembly as set forth in claim 3 wherein the wobble bar is rigidly secured to the rotary shaft for rotation therewith.

6. The fluid control valve assembly as set forth in claim 3 wherein the actuating means further includes an actuator housing mounted on the valve housing, the actuator housing having a cavity therein, a diaphragm extending across the cavity of the actuator housing and defining a sensing chamber with the cavity, an inlet tube extending to the actuator housing cavity, the tube being adapted to be connected to a low pressure controlling fluid source, a slidable shaft extending through the housing, one end of the shaft being connected to the diaphragm and the other end of the slidable shaft extending outside of the actuator housing, and connecting means extending between the other end of the slidable shaft and the outer end of the rotary shaft.

7. The fluid control valve assembly as set forth in claim 6 in which the actuator means further includes adjustment means mounted on the actuator housing for applying a positive actuating pressure to the diaphragm.

8. The fluid control valve assembly as set forth in claim 6 wherein the connecting means includes a pin interconnected with the rotary shaft and extending at right angles thereto, and a clevis carried by the other end of the slidable shaft, said clevis being provided with an aperture which receives said pin.

9. The fluid control valve assembly as set forth in claim 1 wherein the valve housing is provided with a second outlet port, there being a second tubular member having first and second portions, the first portion being connected to the second outlet port, and the second portion being disposed within the cavity, the second portion having an aperture in a sidewall, wherein the wobble bar has a second end disposed adjacent the second portion of the second tubular member, wherein the rubber-like sheet of material has a third portion disposed adjacent the second end of the wobble bar, and a fourth portion adapted to overlie the aperture within the second portion of the second tubular member, and wherein the resilient means has a third portion disposed adjacent the third portion of the rubber-like sheet and a fourth portion disposed adjacent the fourth portion of the rubber-like sheet.

10. The fluid control valve assembly as set forth in claim 9 wherein the second portion of the first and second tubular members are disposed parallel to each other.

11. The fluid control valve assembly as set forth in claim 10 wherein the actuating means includes a rotary shaft journaled within a sidewall of the housing, the rotary shaft having an inner end disposed within the cavity and an outer end disposed outside of the cavity, the wobble bar being rigidly secured to the inner end of the shaft for rotation therewith, and wherein the shaft is disposed parallel to the second portion of the first and second tubular members.

12. The fluid control valve assembly as set forth in claim 1 wherein the first tubular member is a very smooth polished cylindrical bar of stainless steel, the bar having a bore drilled concentrically from one end to a location just beyond the aperture in the sidewall.

13. A fluid control valve operable in response to very small changes in pressure; said valve comprising:

a valve housing having an enclosed cavity therein capable of containing fluid under pressure;

inlet and outlet ports, each extending through a sidewall of the valve housing between an exterior surface of the valve housing and the cavity;

a rotary shaft journaled within a sidewall of the valve housing, the rotary shaft having an inner end disposed within the cavity and an outer end disposed outside of the valve housing;

a first tubular member having a first portion received by the outlet port and a second portion disposed within the cavity, said second portion extending parallel to the shaft and having a closed end and an aperture in a sidewall at right angles to the plane defined by the rotary shaft and the second portion of the first tubular member;

a wobble bar disposed within the cavity and rigidly secured to the rotary shaft for rotation therewith, the wobble bar having a first end disposed adjacent the second portion of the first tubular member;

a rubber-like sheet of material disposed within the cavity, a first portion of the sheet being disposed adjacent the first end of the wobble bar, and a second portion of the sheet being adapted to overlie the aperture within the second portion of the first tubular member;

a block of resilient sponge-like material disposed within the cavity, a first portion of the block being disposed adjacent the first portion of the rubber-like sheet and a second portion being disposed adjacent the second portion of the rubber-like sheet, the block of resilient material normally forcing the first and second portions of the sheet of rubber-like material into respective contact with the first end of the wobble bar and the second portion of the first tubular member about the aperture to cause the aperture to be closed;

pressure responsive means; and connecting means interconnecting the pressure responsive means with the rotary shaft, said means being capable of causing the shaft and the wobble bar to be rotated in response to small changes in pressure between a normal position and a first operative position, the wobble bar bearing down upon the rubber-like sheet of material when in its first operative position to cause the second portion of the block of resilient material to be compressed and to shift the second portion of the sheet of rubber-like material away from the aperture in the tubular member to cause the aperture to be uncovered whereby fluid can flow from the inlet port to the outlet port.

14. The fluid control valve assembly as set forth in claim 13 wherein the valve housing is provided with a second outlet port, there being a second tubular member having first and second portions, the first portion being connected to the second outlet port, and the second portion being disposed within the cavity, the second portion having an aperture in a sidewall, wherein the wobble bar has a second end disposed adjacent the second portion of the second tubular member, wherein the rubber-like sheet of material has a third portion disposed adjacent the second end of the wobble bar, and a fourth portion adapted to overlie the aperture within the second portion of the second tubular member, and wherein the block of resilient material has a third portion disposed adjacent the third portion of the rubber-like sheet and a fourth portion disposed adjacent the fourth portion of the rubber-like sheet.

15. The fluid control valve assembly as set forth in claim 14 wherein the block of resilient material is a very soft, open cell sponge pad, the sponge pad being provided with a recess between its first and third portions.

16. A fluid control valve in combination with pressure responsive means of the type having an actuator housing provided with a cavity, a diaphragm extending across the cavity to form a sensing chamber therein, an inlet tube extending through the housing into the sensing chamber for providing a controlling pressure therein, and a slidable shaft extending through the housing; said fluid control valve being characterized by a valve housing having an enclosed cavity therein capable of containing air under pressure, inlet and outlet ports, each extending through a sidewall of the valve housing between an exterior surface of the valve housing and the enclosed cavity;

a first tubular member having first and second portions, the first portion being connected to the outlet port and the second portion being disposed within the valve housing cavity, the second portion having a closed end and an aperture in a sidewall;

a wobble bar disposed within the valve housing cavity and moveable between a normal position and a first operative position, the wobble bar having a first end disposed adjacent the second portion of the first tubular member;

a rubber-like sheet of material disposed within the valve housing cavity, a first portion of the sheet being disposed adjacent the first end of the wobble bar, and a second portion of the sheet being adapted to overlie the aperture within the second portion of the first tubular member;

a block of resilient material disposed within the valve housing cavity, a first portion of the block being disposed adjacent the first portion of the rubber-like sheet and a second portion being disposed adjacent the second portion of the rubber-like sheet, the block of resilient material when the wobble bar is in its normal position forcing the first and second portions of the sheet of rubber-like material into respective contact with the first end of the wobble bar and the second portion of the first tubular member about the aperture to cause the aperture to be closed;

a rotary shaft journaled within the sidewall of the valve housing, the rotary shaft having an inner end disposed within the cavity and an outer end disposed outside of the valve housing, the wobble bar being rigidly secured to the inner end of the rotary shaft for rotation therewith; and connecting means for connecting the outer end of the rotary shaft to the slidable shaft in such a manner that linear motion of the slidable shaft will cause the rotary shaft to rotate

* * * * *